M. GÜTTNER.
STUFFING BOX.
APPLICATION FILED DEC. 1, 1915.
1,205,887.
Patented Nov. 21, 1916.
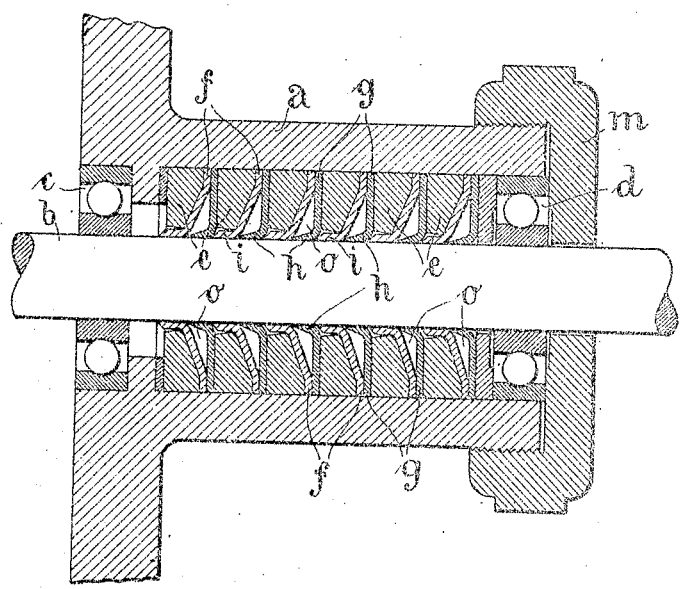
Inventor:
Max Güttner
By phragms in compressing the air or gas con-
UNITED STATES PATENT OFFICE.

MAX GÜTTNER, OF SCHMÖLLN, GERMANY.

STUFFING-BOX.

1,205,887.  Specification of Letters Patent.  Patented Nov. 21, 1916.

Application filed December 1, 1915. Serial No. 64,569.

*To all whom it may concern:*

Be it known that I, MAX GÜTTNER, of 38 Markt, in the town of Schmölln, Saxe-Altenburg, Germany, civil engineer, have invented certain new and useful Improvements in Stuffing-Boxes, of which the following is a specification.

My invention relates to stuffing boxes of the type in which flexible flanged packing rings are separated by rigid metal rings, and the particular object of my invention is to provide a stuffing box of this type which allows of an automatic adjusting of the tightening pressure in accordance with the working pressure of the machine.

In the stuffing box according to the present invention pairs of elastic packing rings provided with cylindrical flanges embracing the piston rod, each pair of rings inclosing a hollow ring-space, are fixed between rigid metal rings, which serve for rigidly holding the flat exterior parts of said elastic rings within the stuffing box shell against any axial displacement. The working pressure of the machine tends to lift the elastic ring of each pair of rings which is nearest to the chamber to be kept tight, off the rigid metal ring supporting it, so as to force it above the flange of the elastic ring next to it.

The preferred form of a stuffing box according to my invention is represented in longitudinal section in the drawings accompanying this specification.

*a* is the stuffing box shell, *b* is the piston rod, *c* and *d* are ball bearings serving to keep said rod in axial position within the shell.

*e e* are rigid metal rings embracing the piston rod, said rings having a flat surface directed toward the chamber to be kept tight and an inclined surface directed toward the outside, a conical recess being thus formed in each ring. Flanged elastic packing rings *f* of any suitable material such as leather, vulcan fiber, rubber, asbestos, sheet metal and the like, cover said conical recesses. Each ring *f* is provided with a cylindrical flange *i* embracing the piston rod. Another elastic ring *g*, which may consist of a similar material, is inserted between each ring *f* and the next following metal ring *e*, the main part of said rings *g* being flat, while their flanges *h* are beveled and enter into the interstices between the piston rod and the flanges *i* of rings *f*.

By tightening the screw cap *m* the packing rings *f* and *g* are pressed against each other at their outer periphery by the rigid metal rings, their diameter being thus increased, which tends to tighten the space confined within the stuffing box shell. On the other hand the working pressure of the machine presses the elastic rings *f* toward the rings *g*, the rings *f* being thereby forced above the beveled edges of the flanges *h* of rings *g*, said flanges being firmly pressed against the piston rod. At the same time the rings *f* are bodily lifted off the conical recesses of the metal rings *e* and are forced into the ring shaped hollow spaces *o* formed between rings *f* and *g*, thus acting like diaphragms in compressing the air or gas confined within said spaces. The air or gas thus compressed within said spaces exerts a uniform pressure upon the cylindrical flanges *h* of rings *g*, such pressure being required for keeping the stuffing box absolutely tight in the case of a rotating piston rod being inserted therein.

As soon as the working pressure is reduced the rings *f* are relieved and owing to their conical shape glide back somewhat on the beveled edges of the flanges *h*. The pressure within the spaces *o* being reduced simultaneously, the flanges *h* are equally relieved.

I claim:—

1. In a stuffing box, in combination, an outer shell, rigid metallic rings located within said shell and presenting substantially flat surfaces to the base end of said shell and a substantially funnel-shaped surface to the outer end of said shell, and a pair of elastic packing rings between each two metallic rings, one elastic ring being closely applied to the funnel-shaped surface of the metal ring, while the other elastic ring is applied to the flat surface of the metal ring next following, a cylindrical flange provided at the inner edge of the first named elastic ring extending into the opening of said metal ring and a cylindrical flange at the inner edge of the other elastic ring.

2. In a stuffing box, in combination, an outer shell, rigid metallic rings located within said shell and presenting substantially flat surfaces to the base end of said shell and a substantially funnel-shaped surface to the outer end of said shell, and a pair of elastic packing rings between each two metallic rings, one elastic ring being closely applied to the funnel-shaped surface of the metal ring, while the other elastic ring is applied to the flat surface of the metal ring next following, a cylindrical flange provided at the inner edge of the first named elastic ring extending into the opening of said metal ring and a cylindrical flange at the inner edge of the other elastic ring, the free edge of said flange being beveled.

3. In a stuffing box, in combination, an outer shell, rigid metallic rings within said shell, ring shaped interstices of substantially triangular section between said rings and a pair of internally flanged elastic packing rings confined between each two succeeding metallic rings, said elastic rings being closely applied to the surfaces of said metallic rings so as to leave interstices between each other.

In testimony whereof I affix my signature in presence of two witnesses.

MAX GÜTTNER.

Witnesses:
  W. H. MEERCKE,
  M. ROTHE.